(No Model.)  B. M. ROLPH.  3 Sheets—Sheet 1.
CULTIVATOR.

No. 531,566.  Patented Dec. 25, 1894.

WITNESSES:
Chas. Nida.
Fred Acker

INVENTOR
B. M. Rolph
BY Munn & Co
ATTORNEYS.

(No Model.) 3 Sheets—Sheet 2.
B. M. ROLPH.
CULTIVATOR.
No. 531,566. Patented Dec. 25, 1894.
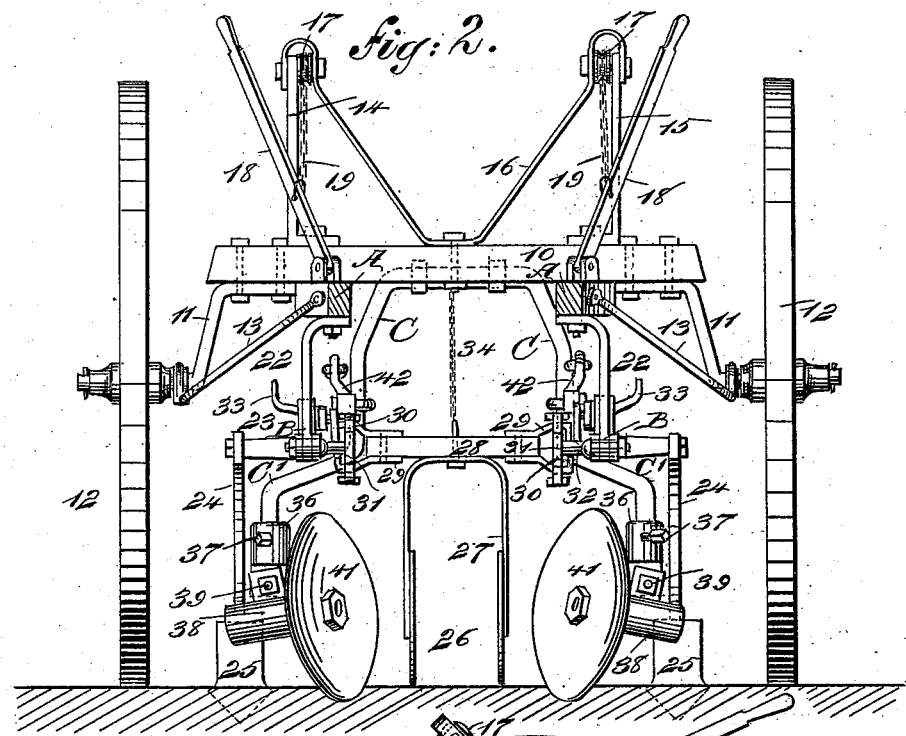
Fig: 2.
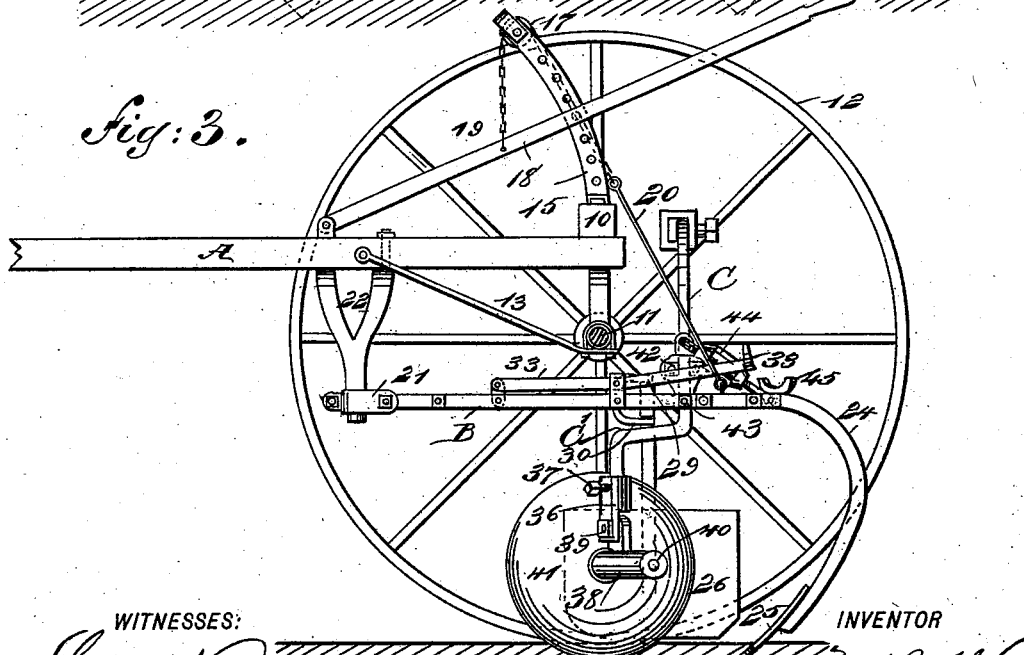
Fig: 3.
WITNESSES:
Chas. Niola
J. Bedecker
INVENTOR
B. M. Rolph
BY
Munn & Co
ATTORNEYS.

(No Model.) 3 Sheets—Sheet 3.

B. M. ROLPH.
CULTIVATOR.

No. 531,566. Patented Dec. 25, 1894.

WITNESSES:
Chas. Nida.
Fred. Acker

INVENTOR
B. M. Rolph
BY Munn & Co.
ATTORNEYS.

UNITED STATES PATENT OFFICE.

BENJAMIN M. ROLPH, OF DIXON, ILLINOIS.

CULTIVATOR.

SPECIFICATION forming part of Letters Patent No. 531,566, dated December 25, 1894.

Application filed March 23, 1894. Serial No. 504,777. (No model.)

*To all whom it may concern:*

Be it known that I, BENJAMIN M. ROLPH, of Dixon, in the county of Lee and State of Illinois, have invented a new and useful Improvement in Cultivators, of which the following is a full, clear, and exact description.

My invention relates to an improvement in cultivators, especially disk cultivators. Disk cultivators possess advantages over shovel or blade cultivators and teeth cultivators, since they throw a steady furrow or stream of earth and discharge it at a given height, never over the shields. Furthermore, they may be made to cultivate close to large corn without injury to the roots, they do not gather trash, and will work much better in sod and will cut up vines or weeds in their path. The objections to disk cultivators have been first, the difficulty of running them deep in hard ground, second, difficulty of shifting them in the cultivation of crooked rows, and third, the unnecessary weight required under the ordinary construction to force the disks set in the ordinary manner into the ground a proper distance, causing heavy draft.

The object of the present invention is to so construct the disk cultivator as to overcome the difficulties above enumerated.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1:
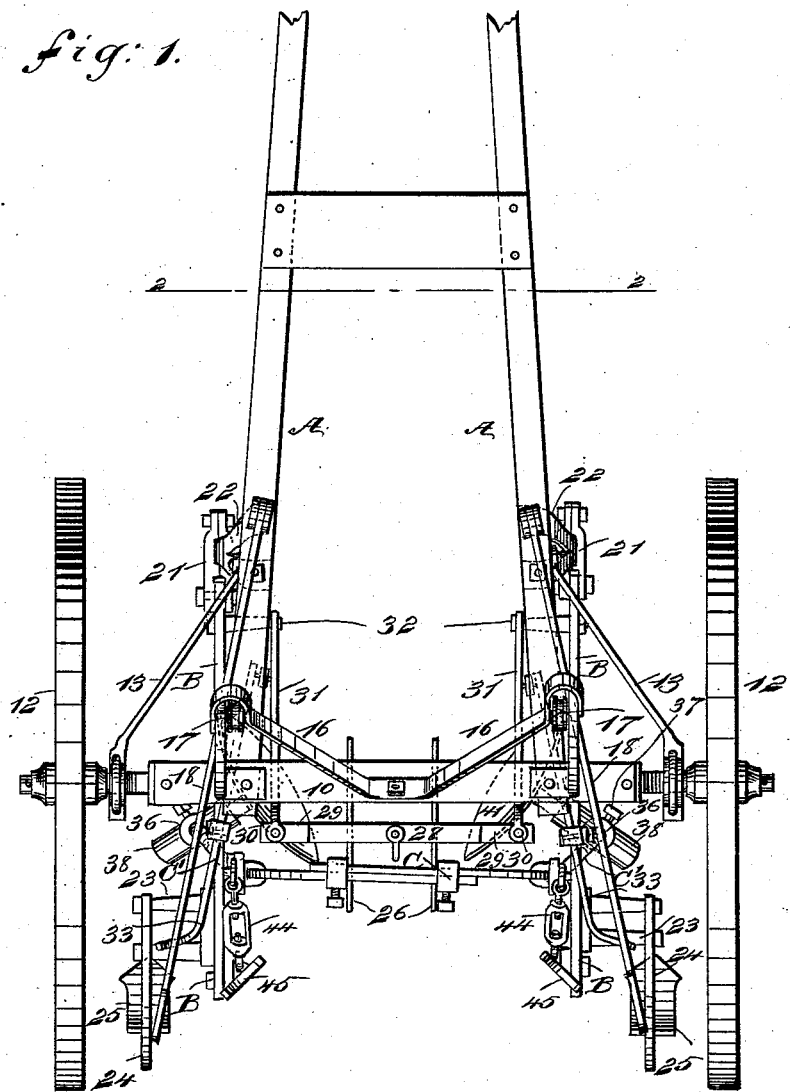
Figure 4:
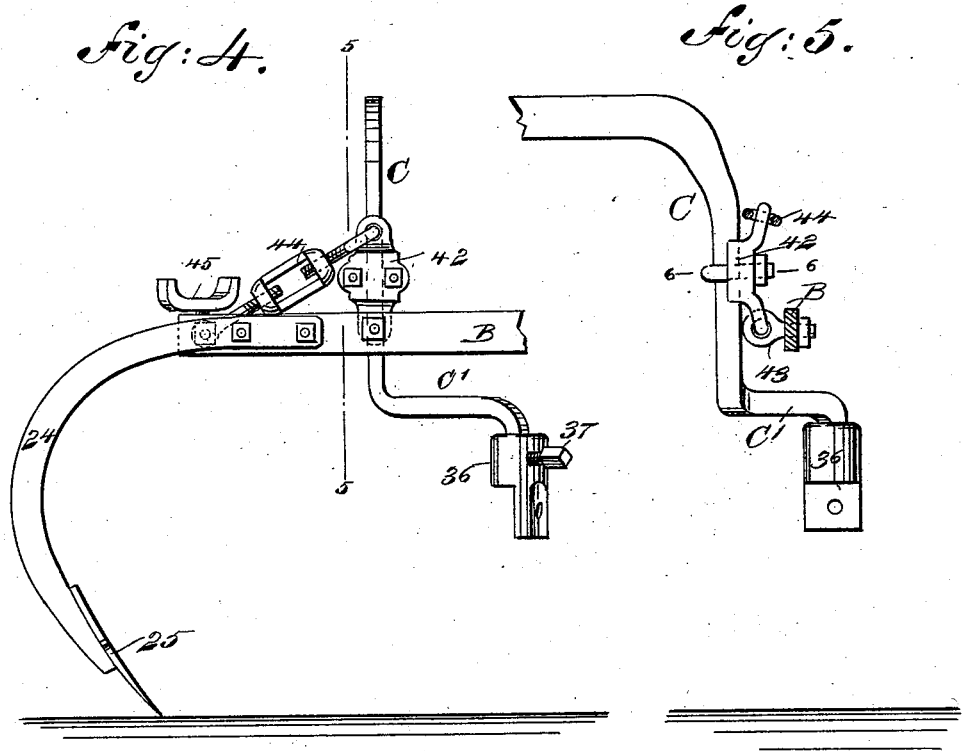
Figure 5:
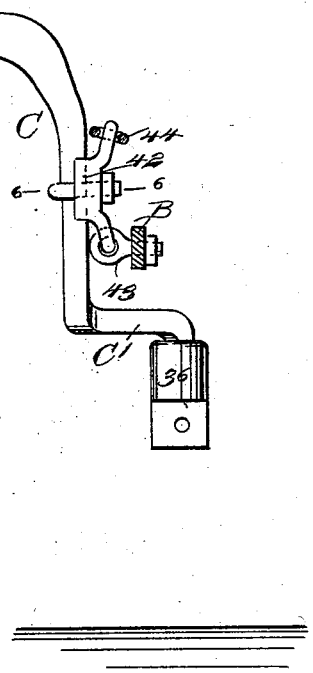
Figure 6:
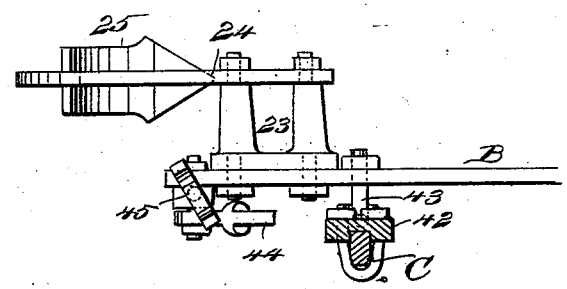

Figure 1 is a plan view of the improved disk cultivator. Fig. 2 is a forward elevation thereof, the shafts being shown in horizontal section practically on the line 2—2 of Fig. 1. Fig. 3 is a side elevation of the cultivator, one of the wheels being removed. Fig. 4 is an enlarged detail view of the outer side portion of one of the beams. Fig. 5 is a section taken essentially on the line 5—5 of Fig. 4, and Fig. 6 is a section on the line 6—6 of Fig. 5.

In carrying out the invention the shafts A are carried rearward to meet a central cross bar 10, which may be termed the body bar of the frame of the cultivator, and axles 11 preferably of an angular construction are secured one to the under face of the body beam at each end, the lower horizontal members of which axles carry the supporting wheels 12, and the axles are preferably connected with the shafts through the medium of brace rods 13.

Two racks 14 and 15 are secured upon the upper portion of the body bar, one near each end, and they are usually connected through the medium of a substantially V-brace 16; and between the upper portion of the members of the brace and the upper end of each of the racks a friction roller 17, is journaled, and upon each member of the shaft A a lever 18, is fulcrumed, which levers lead rearward convenient to the driver, and are adapted for engagement with the rack. Each lever is provided with a chain 19 attached to it preferably between its center and forward end, and the said chains extend over the friction pulleys 17 in a rearwardly direction, and are connected with links 20, shown in Fig. 3, the links being attached to the beams B of the cultivator, two of which are employed; and said beams may be arranged in parallel lines, as shown in Fig. 1, or they may be made to diverge at their rear extremities. Each beam is pivoted at its forward end in a shoe 21 of a bracket 22, the said brackets being projected downward from the under faces of the members of the shaft, as is likewise shown in Fig. 3. Each beam at its rear end is provided with an outwardly-extending horizontal extension 23, and upon each extension of each beam the shank 24 of a blade cultivator 25 is attached in any suitable or approved manner.

Shields 26, adapted to protect the young plants when being cultivated, are connected by a yoke 27, as shown in Fig. 2, the said yoke being secured to the central portion of a cross bar 28, which cross bar is preferably provided at each end with a metal tip 29, which tip is in the nature of a yoke, extending beyond the ends, and the said yoke tips are pivoted in the bifurcated rear end 30 of an arm 31, which arm is pivoted at its forward end to a stud 32 or its equivalent, projected from the inner face of the beams, whereby the cross bar 28 may have vertical movement and likewise to a certain extent a lateral movement. The shields may be raised from the ground whenever desired through the medium of foot levers 33, which levers are fulcrumed upon the beams and usually have link connection with the arms 31 near their forward or pivoted ends, and the said levers extend rearward a sufficient distance to be readily engaged by the feet of the driver, and the shields may be held permanently in an elevated position through the medium of a chain 34, attached to the center of the cross beam 28, and which may be passed upward over an arch C, forming a portion of the cultivator, or to any other convenient support, the chain being secured in any approved manner.

The beams B are connected through the medium of the arch C. This arch is preferably made in two parts in order that it may be widened or rendered narrow according as the beams are to be carried outward or made to approach one another. The arch is of peculiar construction, each member being made to terminate at its lower end in a crank arm C′, the horizontal member of which crank arm, which is the upper member, being made to extend outwardly and forwardly, or diagonally beneath the beam in a forwardly direction; and a sleeve 36, is adjustably mounted upon the end of each crank arm, being usually secured thereon through the medium of a set screw 37. Each sleeve 36 carries a horizontal bearing 38, the said bearing being connected with the sleeve by passing a bolt 39, provided with a suitable nut, through a recessed surface in the sleeve, and a lug upon the bearing as shown in Figs. 2 and 3.

Each bearing 38 has journaled therein a spindle 40, carrying at its inner end a disk 41. Owing to the position of the crank arm the cultivator disks stand diagonally beneath the beams, and the opposing disks are made to converge at their rear edges and diverge at their forward edges, but two disks being employed, one at each side of the shields. Owing to the adjustability of the sleeves 36, the cultivator disks may be raised and lowered as occasion may demand to cause them to enter the ground to a greater or to a less degree, and the disks through the medium of their adjustable bearings may be given a greater or a less diagonal inclination by adjusting the sleeves likewise upon the crank arms; or they may be given more or less of a vertical pitch inward or outward by simply adjusting the bearings upon the sleeves.

The connection between the arch C and the beams is an adjustable and a removable one, the preferred connection consisting in attaching to the outer face of each member of the arch a block 42, as shown in Figs. 4 and 5, the said block being flared outwardly at both of its ends and provided at each extremity with an eye. The lower eyes of the connecting blocks 42, are connected with an eye bolt 43, as shown best in Fig. 5, and the said eye bolts are passed through the beams and are secured by a nut or its equivalent.

The upper eye of each of the connecting blocks 42, is connected with one member of a turn buckle 44, the other member of the turn buckle being attached to the rear inner portion of the beam near which it is located; and through the medium of the said turn buckles the arch may be held perpendicular, or may be given more or less of a rearward inclination as occasion may demand. Foot rests 45, are located at the ends of the beams, through the medium of which the driver may shift the beams to the right or to the left when the rows cultivated are irregular.

The difficulty ordinarily experienced in ordinary disk cultivators, that of running them to proper depth in hard ground, is overcome by reason of the adjustable connection between the bearings of the disks, their sleeves and the crank arms of the arch, whereby the disks may be brought more or less directly under the weight of the driver, and given more or less of a forward inclination; that is to say, the lower edge of the disk can be set forward, making a light draft, at the same time insuring the disk traveling to a proper depth even though the ground be very hard, and as two disks only are employed, it will be observed that but little weight will be required to maintain them in the ground.

The second difficulty usually experienced and heretofore referred to, consists in shifting disk cultivators in crooked rows. This difficulty of shifting is usually caused by one gang of disks taking more soil than the other when moved off of the center. As a remedy for this objection the arch is pivotally connected with the beams, and its adjustment is controlled equally at opposite sides by the turn-buckles, whereby opposing disks are correspondingly located at all times and correspondingly moved with each movement of the beam; and it may here be remarked that the shoes 21 of the hangers 22 to which the beams are pivotally connected, are capable of turning upon the hangers so that the driver may move the beams to either side, as may be desired.

With reference to the unnecessary weight heretofore required, it is not needed under this construction, owing to the adjustment of the disks shown and described, and by reason of the fact that but two disks are needed, being of substantially equal service to that of two gangs.

The crank shape of the lower end of the arch, permits of the disks being placed forwardly without shortening the swing of the machine, and the arrangement of the disks is such that it will not clog up in wet ground, and the machine may be readily converted into a shovel plow by removing the arch.

The shield can be elevated at least eight inches from the ground by means of the foot levers and while the machine is in motion, which is a great advantage in plowing uneven ground or corn, and in dislodging any article that may be held between the shields and the disk or shovel.

The beams may be raised, as well as everything connected with them, through the medium of the levers 18, when traveling to or from the field to be cultivated.

Having thus described my invention, I claim as new and desire to secure by Letters Patent—

1. In a cultivator, the combination with the beams adapted to carry plows, of a shield adapted to be located between the beams, a cross bar to which the shield is attached, arms pivotally connected with the beams and likewise pivotally connected with the ends of the cross bar and levers fulcrumed on the beams, and connected with the said arms, whereby the shield may be raised and lowered independent of the movement of the plow beams, substantially as shown and described.

2. In a cultivator, the combination with the beams adapted to carry plows, of a shield adapted to be located between the beams, a cross bar to which the shield is attached, arms pivotally connected at their forward ends with the beams and pivotally connected at their rear ends with the ends of the cross bar, levers fulcrumed upon the beams and having link connection with the said arms near their pivoted ends, the said levers extending rearward and adapted to be engaged by the feet of the driver, substantially as shown and described.

3. In a cultivator, the combination with the plow beams, of the shields adapted to be located between the beams, a cross bar to which said shields are secured the said cross bar being provided at each end with a yoke tip arms pivotally connected at their forward ends to the beams, and having bifurcated rear ends in which the said yoke tips of the cross bar are pivoted, and levers fulcrumed upon the beams and connected with the arms near their forward or pivoted ends substantially as shown and described.

4. In a cultivator, the combination with beams adapted to carry plows, of an arch carried by the beams and connected to the latter, the said arch being made to terminate at its lower ends in crank arms, the horizontal or upper member of each of said crank arms extending outwardly and forwardly beneath the beams, sleeves arranged upon the lower or vertical members of the crank arms, and adjustable vertically and circumferentially thereon, disks carried by the said sleeves and adapted to be raised and lowered when the sleeves are vertically adjusted, and to be given a greater or less diagonal inclination when the sleeves are circumferentially adjusted, the connection between the said disks and the sleeves being adjustable, whereby the vertical pitch inward or outward of the said disks may likewise be varied, substantially as shown and described.

5. In a cultivator, the combination with beams adapted to carry plows, of an arch carried by the beams and connecting the same, the lower ends of the arch being made to terminate in crank arms, the horizontal or upper members of said crank arms having an outward and forward inclination, sleeves adjustable vertically and circumferentially upon the vertical members of the crank arms, horizontal bearings pivotally connected with the said sleeves, and disks journaled in said bearings, as and for the purpose specified.

6. An arch for disk cultivators, having crank arms formed at the lower portion of its members, the upper or horizontal members of the said crank arms extending outwardly and forwardly from the body of the arch, sleeves mounted upon the lower or vertical members of the said crank arms and adjustable vertically and circumferentially thereon, and bearings adapted to journal disks and pivotally connected with the said sleeves, as and for the purpose specified.

7. In a disk cultivator, the combination, with beams, of an arch terminating in crank arms at its lower ends, the said crank arms having an outward and forward inclination, a pivotal connection between the arch and the beams, take-up devices connected with the beams at the rear of the arch and connected with the arch above its pivot, and bearings located upon the crank arms of the arch and adapted to receive disks, as and for the purpose specified.

8. In a disk cultivator, the combination, with beams adapted to carry plows, an arch the lower extremities of which are provided with crank arms having an outward and forward inclination, and a removable pivotal connection between the arch and the beams, of take-up devices connected with the beams at the rear of the arch and connected with the arch above its pivots, a sleeve adjustably mounted upon each crank arm of the arch, and a horizontal bearing adapted to journal a disk, pivotally connected with each sleeve, substantially as and for the purpose specified.

BENJAMIN M. ROLPH.

Witnesses:
 E. H. BREWSTER,
 H. M. GILBERT.